US011847765B2

(12) United States Patent
Yuan

(10) Patent No.: US 11,847,765 B2
(45) Date of Patent: Dec. 19, 2023

(54) CAMERA NOISE REDUCTION

(71) Applicant: Axis AB, Lund (SE)

(72) Inventor: Song Yuan, Lund (SE)

(73) Assignee: AXIS AB, Lund (SE)

( * ) Notice: Subject to any disclaimer, the term of this patent is extended or adjusted under 35 U.S.C. 154(b) by 228 days.

(21) Appl. No.: 17/210,555

(22) Filed: Mar. 24, 2021

(65) Prior Publication Data
US 2021/0304367 A1 Sep. 30, 2021

(30) Foreign Application Priority Data

Mar. 30, 2020 (EP) .................................. 20166547

(51) Int. Cl.
G06T 5/00 (2006.01)
G06T 5/10 (2006.01)
G06T 5/50 (2006.01)
H04N 5/14 (2006.01)
H04N 23/81 (2023.01)

(52) U.S. Cl.
CPC ............... *G06T 5/002* (2013.01); *G06T 5/10* (2013.01); *G06T 5/50* (2013.01); *H04N 5/145* (2013.01); *H04N 23/81* (2023.01)

(58) Field of Classification Search
USPC .................................................. 382/260, 275
See application file for complete search history.

(56) References Cited

U.S. PATENT DOCUMENTS

| 8,928,765 | B2* | 1/2015 | Zhou ................. H04N 23/6812 |
| | | | 348/208.4 |
| 9,449,374 | B2* | 9/2016 | Nash .................... H04N 23/683 |
| 2005/0203430 | A1* | 9/2005 | Williams .......... G06Q 30/0609 |
| | | | 600/513 |
| 2010/0034274 | A1 | 2/2010 | Li |
| 2013/0044241 | A1 | 2/2013 | Zhou |
| 2013/0329063 | A1 | 12/2013 | Zhou |
| 2015/0262341 | A1* | 9/2015 | Nash ..................... H04N 23/80 |
| | | | 348/208.6 |
| 2016/0028966 | A1 | 1/2016 | Sheikh et al. |
| 2017/0310909 | A1 | 10/2017 | Nishimura |
| 2018/0039821 | A1 | 2/2018 | Gren et al. |
| 2018/0324358 | A1 | 11/2018 | Yamada et al. |
| 2019/0297283 | A1 | 9/2019 | Douady et al. |
| 2022/0408003 | A1* | 12/2022 | Choi ..................... H04N 23/71 |

FOREIGN PATENT DOCUMENTS

WO 2004/001667 A1 12/2003

* cited by examiner

*Primary Examiner* — Ishrat I Sherali
(74) *Attorney, Agent, or Firm* — XSENSUS LLP

(57) ABSTRACT

The present disclosure relates to cameras and in particular methods for noise reduction in images captured by a camera, wherein a same perspective transform may be reused for performing temporal noise filtering on a plurality of images.

15 Claims, 5 Drawing Sheets

CAMERA NOISE REDUCTION

CROSS-REFERENCE TO RELATED APPLICATION

This application claims priority to European Patent Application No. 20166547.8, filed on Mar. 30, 2020, the entire disclosure of which is incorporated by reference herein.

TECHNICAL FIELD

The present disclosure relates to cameras and in particular methods for noise reduction in images captured by a camera.

BACKGROUND

Wearable cameras are becoming more and more common and find use in a wide variety of applications spanning from artistic or recreational use to uses relating to security and documentation. A common problem with wearable cameras, as with many other cameras, is that of image noise produced somewhere in the camera e.g. in the optics, at the image sensor, or in the circuitry. Noise is usually manifested as random variations of brightness and color in images. Noise is particularly prevalent in images captured in low light environments, i.e. when fewer photons are recorded at the image sensor. Low light environments generally correspond to images with a low signal-to-noise ratio, SNR. One technique to mitigate the effects of image noise is called temporal noise filtering, TNF. TNF relies on averaging across a plurality of images captured at different points in time. However, such averaging may lead to motion-induced blur for objects moving in an otherwise static scene and if the entire scene is dynamic, e.g. if the camera is moving, the whole scene may end up featuring blur to some extent. A wearable camera, being worn by a wearer, is expected to always be subject to some motion due to the motion of the wearer, regardless if that motion is based on conscious motion, e.g. the if the wearer is walking, or subconscious motion, e.g. by the wearer breathing. Various techniques for adapting motion compensation depending on the cause of motion is known. However, motion compensation techniques may require excessive computational resources and thus also be more power consuming. This may be a significant issue for wearable cameras, relying on some form of limited power storage, e.g. a battery. Mechanical motion stabilization may also be considered but to adequately address all types motion-induced blur. Such a system may make the wearable camera more complex and bulkier. There is thus a need for improvements within the technical field.

SUMMARY OF THE INVENTION

An object of the present invention is to at least mitigate some of the above issues and to provide improved noise reduction for wearable cameras.

According to a first aspect of the present invention there is provided a method of noise reduction in images captured by a wearable camera, the method comprising:
  A. providing a sequence of temporally successive images,
  B. selecting a first reference image among the temporally successive images,
  C. selecting a first plurality of images among the temporally successive images to be used for temporal noise filtering of the first reference image,
  D. forming a first plurality of transformed images by transforming each of the first plurality of images to have a same perspective as the first reference image,
  E. performing temporal noise filtering, TNF, on the first reference image using the first plurality of transformed images,
  F. selecting a second, different, reference image among the temporally successive images,
  G. selecting a second plurality of images among the temporally successive images to be used for temporal noise filtering of the second reference image, wherein at least one of the images of the second plurality of images is also comprised in the first plurality of images, wherein the second plurality of images comprises the first reference image,
  H. determining whether TNF of the second reference image should be performed or not, wherein upon determining that TNF should be performed, the method further comprises:
  I. forming a second plurality of transformed images by:
    I1. for each image of the second plurality of images not comprised in the first plurality of images, transforming said image to have a same perspective as the second reference image;
    I2. for each image of the second plurality of images also comprised in the first plurality of images, transforming the corresponding transformed image among the first plurality of transformed images to have a same perspective as the second reference image;
  J. performing temporal noise filtering on the second reference image using the second plurality of transformed images.

The term "wearable camera" may be understood as a camera configured to, when in use, be worn by a wearer. Body-worn cameras, eyewear mounted cameras, and helmet mounted cameras should be considered as non-limiting examples of the term wearable camera. The wearer may e.g. be a human or animal.

The term "temporally successive images" may be understood as images or image frames captured successively, at different points in time. In other words, a first image is captured previous in time compared to the time of capture for a second image, which in turn is captured previous in time compared to the time of capture for a third image, etc. The images or image frames may together form a sequence of temporally successive images or image frames of a video stream.

The term "transforming . . . images to have a same perspective" may refer to transforming an image or creating a projection of the image as if it was captured with the camera located and oriented in the same way as when it captured another image. The wording should be understood as referring to a substantially same perspective. Various ways to achieve perspective transformation may include using homography and image projection. Readings from sensors such as e.g. accelerometers and gyroscopes may be employed to conduct the perspective transformation. Perspective transform may comprise calculating a homography based on pairs of corresponding candidate points in two different images.

Note that the steps A-J may not need to be performed temporally in the order in which they are presented in this disclosure. Steps 11 and 12 should be understood as both being parts of step I.

The above method provides a way to optimize TNF of images captured by a wearable camera. In particular, the method may reduce computational effort and energy use. This is achieved by creating a process flow where the second transforming step may benefit from being able to reuse the same perspective transform for at least two images when forming the second plurality of transformed images. This should be understood as being the case since at least one of the first plurality of transformed images and the first reference image are present in the second plurality of images, enabling the use of a same perspective transform when transforming these images to the same perspective transform as the second reference image. This means that less new perspective transforms may need to be calculated/determined when producing the second plurality of transformed images. Furthermore, reuse of instructions for performing the perspective transforms may reduce the amount of storage or cache storage required for transforming the images.

The present invention should be understood in such a way that repeated iteration of the provided method advantageously enables greater reuse of perspective transforms e.g. for video streams comprising large numbers of temporally successive images.

The gains of effort reduction will become more significant as the process is scaled up through continuous iteration, as would be the case when performing the method on a continuous stream of images, i.e. video.

According to some embodiments of the first aspect the method may further comprise deleting one of the temporally successive images from a memory of the wearable camera after transforming said one of the temporally successive images to have the same perspective as the first or the second reference image.

An advantageous effect of such embodiments may be that of reducing the computer memory requirements. This is possible as according to the method the original perspective images may be superfluous once they have been transformed to feature another image perspective, since the transformed images are in fact used if needed for performing TNF on other images among the temporally successive images (see e.g. step I2).

According to some embodiments of the first aspect each image of the first plurality of images may temporally precede the first reference image, and each image of the second plurality of images temporally may precede the second reference image.

By such embodiments, latency may be reduced. This is the case as only temporally preceding image information is used for the TNF of reference images meaning the delay between providing an image and performing TNF on the same is reduced. Reducing latency may be particularly advantageous when the method is applied for live video streams.

According to some embodiments of the first aspect the first plurality of images may comprise 4-8 images, and wherein the second plurality of images may comprise 4-8 images.

The more images that are used for TNF may generally improve the results of the noise reduction method. More images also enable greater reuse of perspective transforms. However, the computational complexity of the TNF is generally increased when more images are used. The range of images according to this embodiment represents a good consideration between the quality of TNF and the computational complexity.

According to some embodiments of the first aspect, forming the first plurality of transformed images and forming the second plurality of transformed images may comprise transforming images to have a same perspective as the associated reference image based on comparing motion data associated with each image in the sequence of temporally successive images.

The term "motion data" may refer to any data or information regarding the physical movement of the camera relative to the scene it monitors.

Such embodiments provide flexibility for performing the method as various types of motion data may exist and a wide array of means for determining the motion data may be applicable.

According to some embodiments of the first aspect the motion data associated with each image in the sequence of temporally successive images may be determined by at least one of a motion sensor, an accelerometer, and a gyroscope, or wherein the motion data is determined based on image analysis of the images.

When mounted on or in connection with a camera, an accelerometer may provide accurate motion data in relation to direction of movement, speed, and acceleration of the camera. When mounted on or in connection with a camera, a gyroscope may provide accurate motion data in relation to orientation of the camera. A motion sensor may provide similar and/or further motion data. Image analysis may provide motion data based on analysis of images captured by the camera, for example by comparing consecutively captured images. The above methods to determine motion data may be combined or performed in combination with each other.

According to some embodiments of the first aspect step H may further comprise determining a perspective difference between at least two images of the first plurality of images, wherein TNF of the second reference image is performed upon determining that the perspective difference is less than or equal to a predetermined perspective difference threshold, and wherein TNF of the second reference image is not performed upon determining that the perspective difference is larger than the predetermined perspective difference threshold.

It may be preferable to only perform TNF if the motion is within certain compliance limits. TNF relies on averaging temporally successive images. Performing TNF on successive images comprising too much motion may result in distortion of image details. In such cases it may be advantageous to not go through the effort of performing the second round of TNF at all. Furthermore, this may also provide an advantageous effect in reducing the computational effort required by essentially not going through the rest of the noise reduction steps as long as the motion is too large.

According to some embodiments of the first aspect the perspective difference may be based on at least one of:
motion data temporally associated with each image, wherein the motion data is determined by a motion sensor, an accelerometer, or a gyroscope; and
image data relating to how many pixels have changed between subsequent images of the first plurality of images.

By using another sensor than the camera, such as a motion sensor, an accelerometer, or a gyroscope, the determination may be made more robust and non-reliant on camera operation. By using the image data of the camera, the system may be made less complex and less reliant on other sensors. Determining how many pixels have changed between subsequent images may provide ease of applicability and adaptability the determination whether TNF should be performed or not.

According to some embodiments of the first aspect the method may further comprise, prior to step A, determining a capture condition for the sequence of temporally successive images, wherein the steps A-J are only performed upon determining that the capture condition meets a predetermined capture condition requirement.

It may be preferable to only perform TNF if the capture conditions are within certain compliance limits. It may be understood that certain image capture conditions are not suitable for TNF due to expected image detail distortion. It may therefore be advantageous to check whether capture conditions are favourable, or at least acceptable, before performing the steps of the method. Similar to above embodiments, this may also provide advantageous effects in reducing the computational effort required by essentially not going through the rest of the method steps as long as the capture conditions are not meeting the predetermined capture condition requirement.

According to some embodiments of the first aspect the capture condition is determined by at least one of:
- a level of motion determined by a motion sensor, an accelerometer, a gyroscope, or a positioning device; and
- a light level determined by a light sensor or by image analysis.

It may be preferable to not perform the method steps A-J if the level of motion is too high. This may be understood as similar to the embodiments discussed in the above wherein the second round of TNF is not performed when motion is too large and expected to distort image details. A too high level of motion may reduce the viability of successful perspective transform i.e. causing the transformed images to be distorted. A too high level of motion may also reduce the viability of successful TNF by the reduced number of common pixels between temporally successive images.

Positioning devices, e.g. a global navigation satellite system, GNSS, tracker/receiver, may be used to determine if the level of motion is too high. Such devices may be advantageously used in connection with a camera to determine a speed at which a wearer is moving. The speed may be used to determine if the wearer is e.g. running or walking. The steps A-J may be performed e.g. if the wearer is walking but not if the wearer is running, due to the expected higher motion level of the latter activity.

It may also be preferable to not perform the method steps A-J based on the light level. TNF may give rise to image detail distortion when applied on low light images, why it may be favourable to avoid the method steps A-J altogether if the light level is unsatisfactory. If on the other hand the light level is too high TNF may not be required or necessary. TNF may thus be advantageously avoided.

If the light level exceeds predetermined thresholds it may further be established that there is no need for the motion level to be recorded. Thus, sensors and means for recording motion, motion data, and/or motion levels may be turned off to conserve battery energy of e.g. the wearable camera.

Light level and level of motion may be combined, e.g. as a figure of merit, or evaluated in combination, for determining the capture condition.

According to some embodiments of the first aspect the capture condition is determined by a light level determined by a light sensor or by image analysis, wherein the predetermined capture condition requirement is a light level lower than a predetermined level.

TNF may generally be more necessary in low light conditions. This may be due to a cameras or image sensors often exhibiting lower signal-to-noise ratios in low light conditions. As such, an upper threshold for performing the method steps A-J may be preferable.

According to some embodiments of the first aspect the method may further comprise storing the first reference image on a memory of the wearable camera after performing TNF on the first reference image and storing the second reference image on the memory of the wearable camera after performing TNF on the second reference image.

The reference images, on which TNF has been performed, may thus form a final video stream that may be stored on the memory of the wearable camera.

According to some embodiments of the first aspect the method may further comprise transmitting the first reference image from the wearable camera to a remote device after performing TNF on the first reference image and transmitting the second reference image from the wearable camera to the remote device after performing TNF on the second reference image.

The reference images, on which TNF has been performed, may thus form a final video stream being transmitted to a remote device for display or storage. Advantageously, the reference images may thus not need to be stored for extended periods on a memory of the wearable camera.

According to a second aspect of the present invention there is provided a wearable camera comprising an image capturing unit and a computing unit, the wearable camera being configured for:
- A. capturing, by the image capturing unit, a sequence of temporally successive images,
- B. selecting, by the computing unit, a first reference image among the temporally successive images,
- C. selecting, by the computing unit, a first plurality of images among the temporally successive images to be used for temporal noise filtering of the first reference image,
- D. forming, by the computing unit, a first plurality of transformed images by transforming each of the first plurality of images to have a same perspective as the first reference image,
- E. performing, by the computing unit, temporal noise filtering, TNF, on the first reference image using the first plurality of transformed images,
- F. selecting, by the computing unit, a second, different, reference image among the temporally successive images,
- G. selecting, by the computing unit, a second plurality of images among the temporally successive images to be used for temporal noise filtering of the second reference image, wherein at least one of the images of the second plurality of images is also comprised in the first plurality of images, wherein the second plurality of images comprises the first reference image,
- H. determining, by the computing unit, whether TNF of the second reference image should be performed or not, wherein upon determining that TNF should be performed, the method further comprises:
- I. forming, by the computing unit, a second plurality of transformed images by:
  - I1. for each image of the second plurality of images not comprised in the first plurality of images, transforming said image to have a same perspective as the second reference image;
  - I2. for each image of the second plurality of images also comprised in the first plurality of images, transforming the corresponding transformed image among the first plurality of transformed images to have a same perspective as the second reference image;

J. performing, by the computing unit, temporal noise filtering on the second reference image using the second plurality of transformed images.

The wearable camera described in the second aspect provides similar advantages as those of the method described in the first aspect due to their corresponding features. The wearable camera may be considered as a device configured for implementing the methods of the first aspect.

According to a third aspect of the present invention there is provided a non-transitory computer-readable storage medium having stored thereon instructions for implementing the methods of the first aspect, when executed by a device having processing capabilities.

The non-transitory computer-readable storage medium described in the third aspect provides similar advantages as those of the method described in the first aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will, in the following, be described in more detail with reference to appended figures. The figures should not be considered limiting; instead they should be considered for explaining and understanding purposes.

As illustrated in the figures, the sizes of layers and regions may be exaggerated for illustrative purposes and, thus, are provided to illustrate the general structures. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
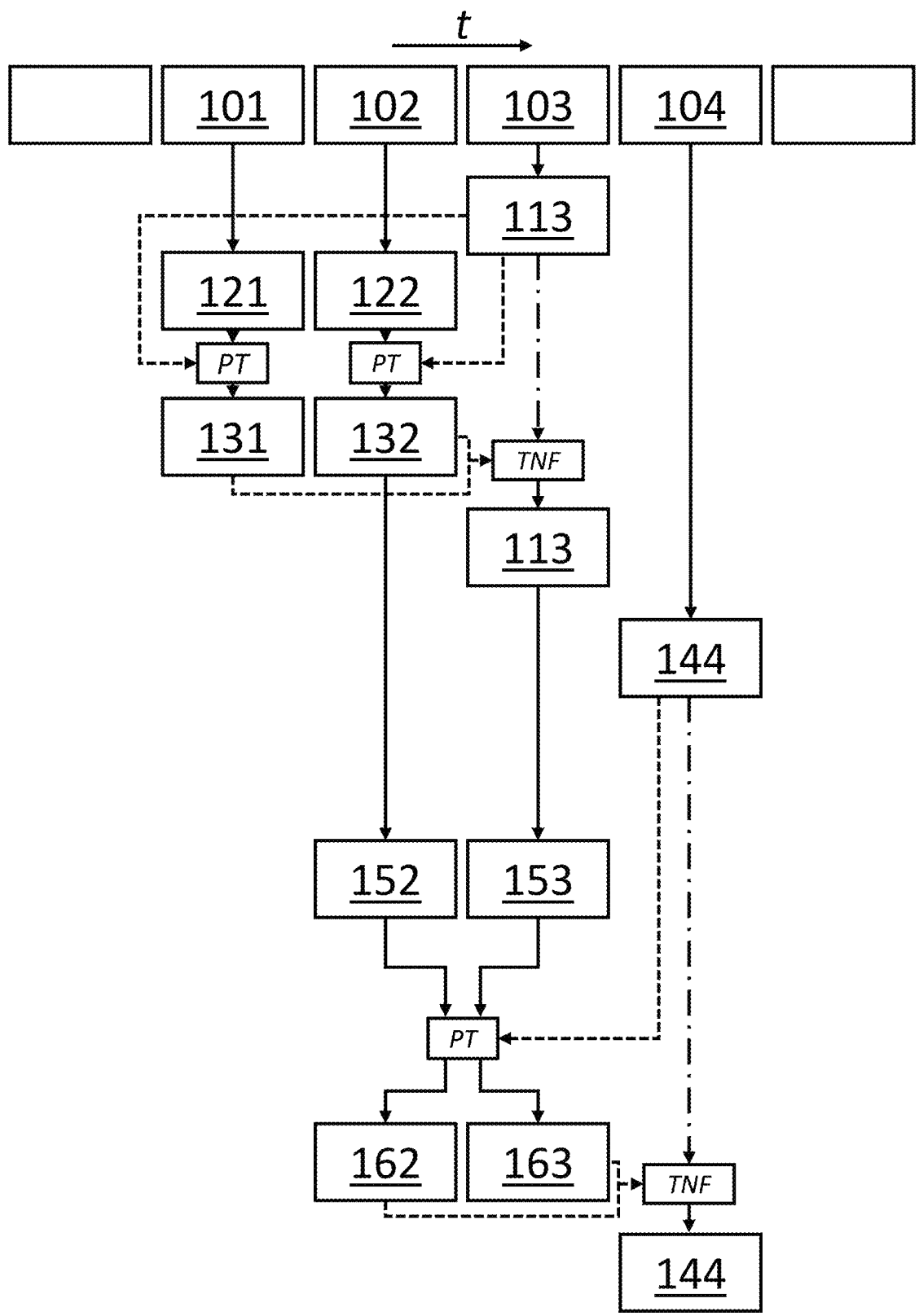
FIG. 1 illustratively shows a method of performing noise reduction on temporally successive images captured by a wearable camera or by a pan/tilt camera, wherein a to be temporally noise filtered reference image is temporally subsequent to a plurality of images on which the noise filtering is based.
Figure 2:
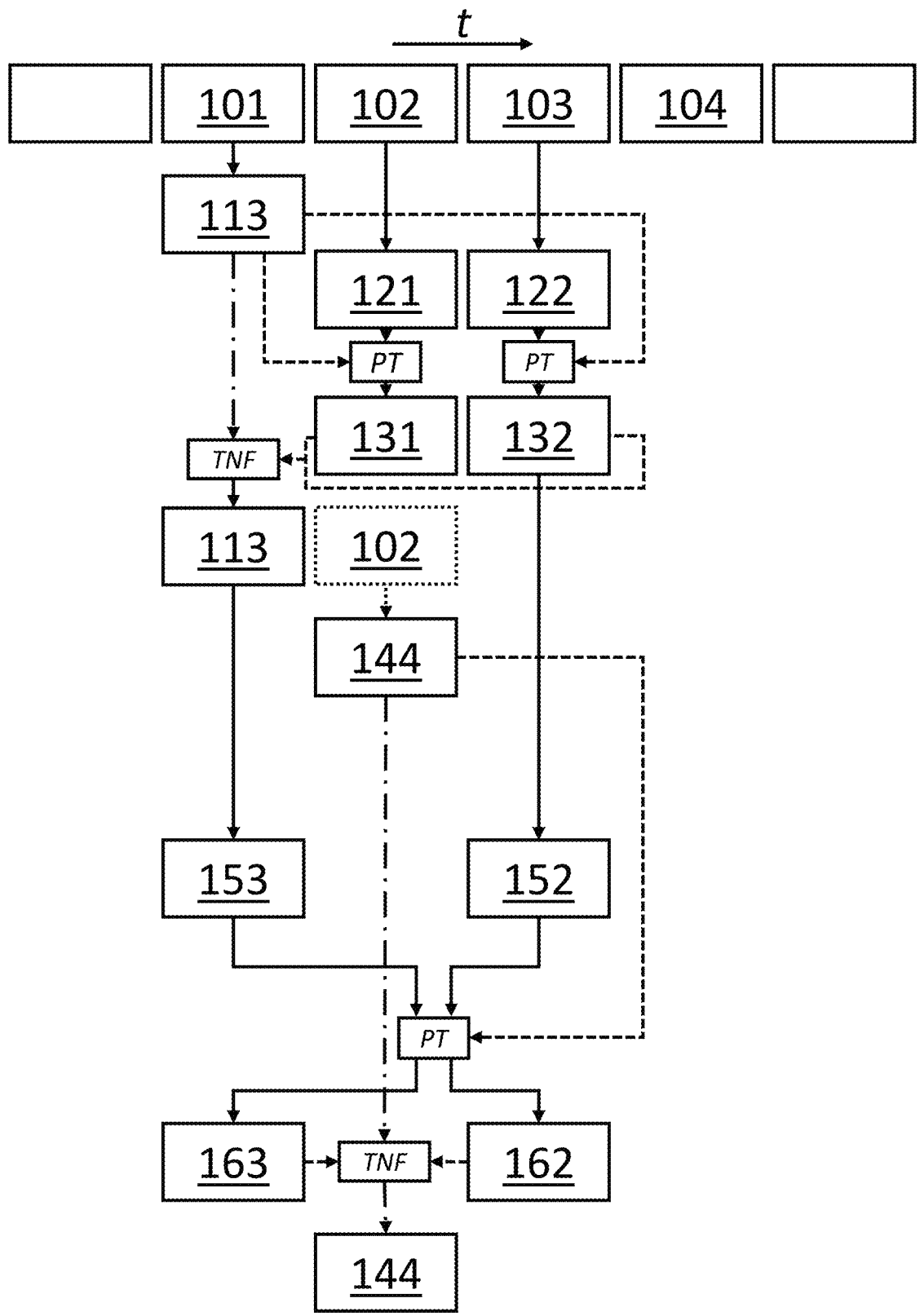
FIG. 2 illustratively shows a method of performing noise reduction on temporally successive images captured by a wearable camera or by a pan/tilt camera, wherein a to be temporally noise filtered reference image is not temporally subsequent to a plurality of images on which the noise filtering is based.
Figure 3:
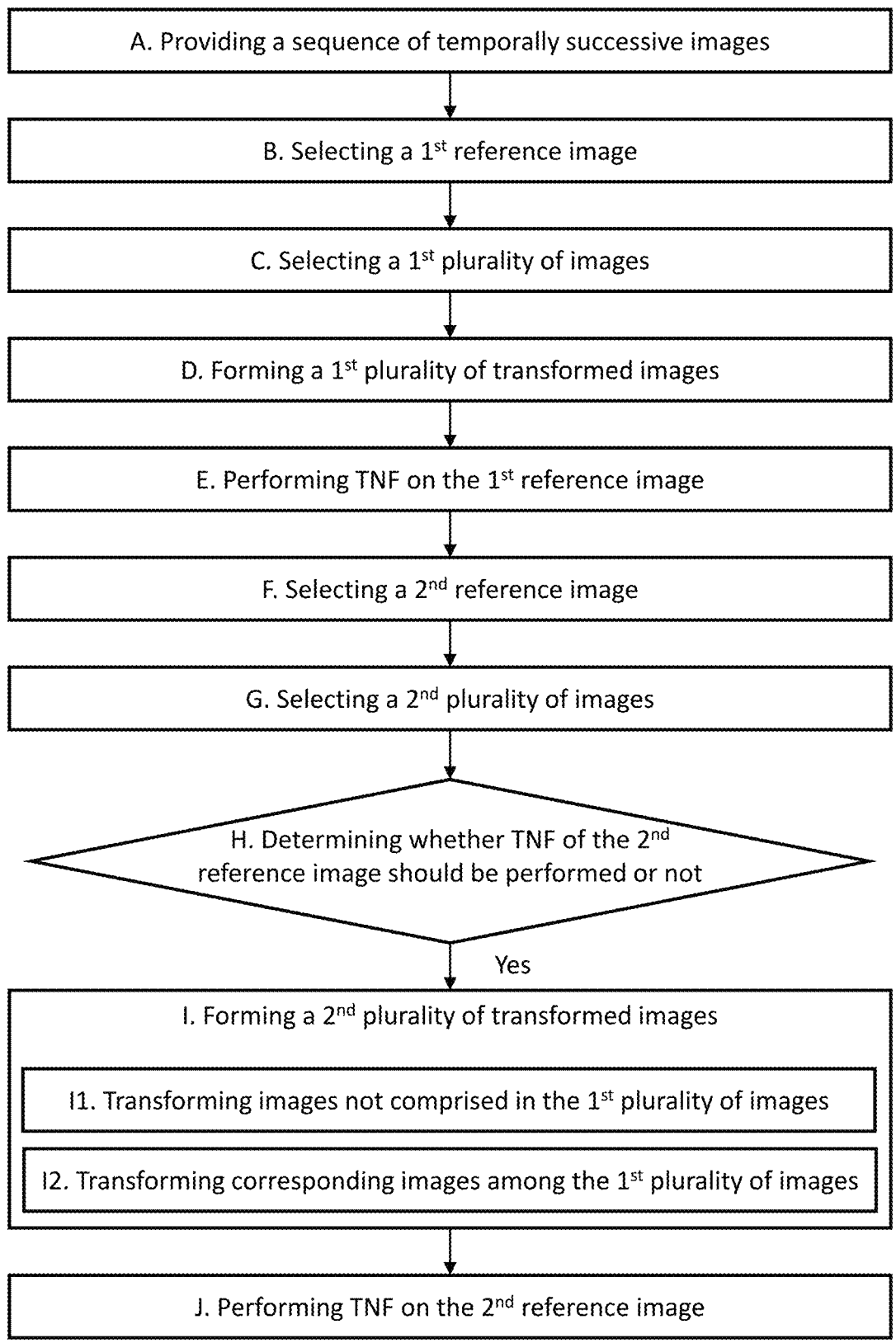
FIG. 3 shows a flowchart of a method of performing noise reduction on images captured by a wearable camera or by a pan/tilt camera.

FIG. 1 and FIG. 2 illustrate methods of noise reduction in images captured by a wearable camera, such as a body worn camera (BWC). FIG. 3 illustrates a flowchart for the same method of noise reduction in images captured by a wearable camera. The method comprises the steps A-J. The method may be implemented in a wearable camera 200, as exemplified in FIG. 4.

The method of FIG. 1, FIG. 2 and FIG. 3 will now be explained in conjunction with the wearable camera 200 of FIG. 4. Reference numerals beginning with the FIG. 1, e.g. 113, refer to images shown in FIG. 1 and FIG. 2. Reference numerals beginning with the FIG. 2, e.g. 202, refer to features shown in FIG. 4.

The blocks shown in FIG. 1 and FIG. 2 represent images or image frames. FIG. 1 and FIG. 2 contain a horizontal time component, relating to when the original images, i.e. the temporally successive images 101, 102, 103, 104 are provided or captured. Blocks located at different horizontal positions within the figures indicate that the images are captured or provided at different points in time. Time t is shown to progress from the left to the right of the figures, i.e. block 101, one of the temporally successive images, is provided or captured before the rest of the temporally successive images 102, 103, 104. The temporally successive images 101, 102, 103, 104 may be provided as raw format images from an image sensor device, i.e. there is no previous image processing of the images before being provided. Alternatively, the present method may be preceded by image processing of the temporally successive images 101, 102, 103, 104 before being provided as input to the method. Non-limiting examples of preceding image processing includes and image data adjustment or correction such as defect pixel removal and column fixed pattern noise filtering. In other words, the temporally successive images 101, 102, 103, 104 may be provided as raw image data or as processed image data. It is however noted that the method according to the present invention is performed before a video encoding process of the images, i.e. the temporally successive images 101, 102, 103, 104 are unencoded/not video encoded.

FIG. 1 and FIG. 2 further contain a vertical/column component. Images located below others, in a same column, indicate that they are selected, processed, transformed, or filtered versions of above images in that same column. These below images do not have to correspond to any temporal order of processing/transforming etc. and may be processed/transformed etc. at arbitrary points in time. These images should rather be understood as being primarily based on their above temporally successive images 101, 102, 103, 104.

In FIG. 1 and FIG. 2, temporally successive images 101, 102, 103, 104 are provided in the top row. This should be understood as corresponding to step A of the method in FIG. 3.

It should be noted that step A in the second aspect of the invention, i.e. the aspect providing a wearable camera 200, specifies that the wearable camera 200 is configured for capturing, by an image capturing unit 202, a sequence of temporally successive images 101, 102, 103, 104 while step A in the first aspect, i.e. the aspect providing the method (shown in FIG. 3), specifies providing a sequence of temporally successive images 101, 102, 103, 104. Both these aspects may still be considered as interrelated to each other. The wearable camera 200 of the second aspect uses its own image capturing unit 202 to capture the sequence of temporally successive images 101, 102, 103, 104 while in method of the first aspect does not require a camera per se to capture the temporally successive images 101, 102, 103, 104. The method may be performed remotely from the wearable camera 200 capturing the images, thus only requiring the temporally successive images 101, 102, 103, 104 to be provided.

The method may be performed by, or in, a wearable camera 200. The step A may be performed by the image capturing unit 202 of the wearable camera 200. The steps B-J may be performed by a computing unit 204 of the wearable camera 200.

A first reference image 113 is selected among the temporally successive images 101, 102, 103, 104. This should be understood as corresponding to step B. The first reference image 113 should be understood as an image which should be filtered using TNF. In FIG. 1 the image 103 is selected from the temporally successive images 101, 102, 103, 104 as the first reference image 113. In FIG. 2 the image 101 is selected from the temporally successive images 101, 102, 103, 104 as the first reference image 113.

To facilitate TNF, a first plurality of images 121, 122 among the temporally successive images 101, 102, 103, 104 are selected to be used for temporal noise filtering of the first reference image 113. This should be understood as corresponding to step C. In FIG. 1, the first plurality of images 121, 122 is shown to temporally precede the selected first reference image 113, corresponding to images 101 and 102 of the temporally successive images 101, 102, 103, 104. In FIG. 2, the first plurality of images 121, 122 is shown to temporally succeed the selected first reference image 113, corresponding to images 102 and 103 of the temporally successive images 101, 102, 103, 104. Other embodiments exist where the first plurality of images 121, 122 is selected both from images preceding and succeeding the first reference image 113. It may be beneficial that the first plurality of images 121, 122 may comprise 4-8 images. To facilitate the understanding of the general concept, FIG. 1 and FIG. 2 show the first plurality of images 121, 122 comprising 2 images. The skilled person, familiar with TNF, has the knowledge for applying the herein disclosed concept on any (reasonable) number of images.

After the first plurality of images 121, 122 has been selected, a first plurality of transformed images 131, 132 is formed by transforming each of the first plurality of images 121, 122 to have a same perspective as the first reference image 113. This should be understood as corresponding to step D.

The transformation step D may be performed using homography. The transforming step D may comprise calculating a homography based on pairs of corresponding candidate points in two different images. For homography, images captured at different points in time may be considered as images captured from different cameras in a stereo camera arrangement for purposes of producing a homography matrix.

The transforming step D may be based on comparing motion data associated with each image in the sequence of temporally successive images 101, 102, 103, 104. Motion data associated with each image in the sequence of temporally successive images 101, 102, 103, 104 may be determined by a motion sensor 210, an accelerometer 211, and/or a gyroscope 212. The motion data may alternatively or additionally be determined based on image analysis of the temporally successive images 101, 102, 103, 104.

The motion data may relate to a motion of the wearable camera 200 or of a wearer of the wearable camera 200. The motion data may comprise an acceleration, a velocity, and/or a direction of the motion. The motion data may comprise an orientation and/or a position of the wearable camera 200 or the wearer of the wearable camera 200. The motion data may comprise data relating to rotational motion of the wearable camera 200. The motion data may comprise data relating to tumble/orbit, pan/yaw, tilt/pitch, and/or roll of the wearable camera 200. The motion data may comprise data relating to translational motion of the wearable camera 200. The motion data may comprise data relating to track, dolly, pedestal/boom/jib, and/or truck/crab of the camera.

In FIG. 1 and FIG. 2, blocks labelled PT indicate that a perspective transform is being performed. This works by having a base image being transformed to have the same perspective as an image from a different vertical column, indicated by a dashed arrow pointing towards the PT block. The base image is shown to be transformed by the PT block by solid arrows. Sometimes, the same PT block may be used for transforming several images, as is the case when the images of the second plurality of images 152, 153 are transformed to form the second plurality of transformed images 162, 163 (see further below). In this case, the image 152 may be understood as the base image for the transformed image 162. This same logic may apply to image 153 and its transformed counterpart image 163.

After forming the first plurality of transformed images 131, 132, TNF of the first reference image 113 may be performed, using the first plurality of transformed images 131, 132. This should be understood as corresponding to step E in FIG. 3.

In FIG. 1 and FIG. 2, blocks labelled TNF indicate that a temporal noise filtering step is being performed. In these cases, the base image, in which noise filtering is to be performed, is indicated by dashed and dotted arrows. The dashed arrows pointing towards the TNF block indicate images from different vertical columns that are used in the temporal noise filtering process. The TNF process may e.g. include averaging of image content from images captured at different points in time. Generally, the figures illustratively describe transforming images to have a same perspective before performing temporal noise filtering.

In the figures the reference numerals may be the same before and after performing the TNF steps. This may be motivated by the first and second reference images 113, 144 being raw/unfiltered prior to/above the noise filtering steps, and as essentially the same images after/below the noise filtering steps, albeit ideally with less noise. For the later steps of the method, i.e. from step F, both the raw/unfiltered or the temporally noise filtered reference images 113, 144 may be used.

After performing TNF on the first reference image 113, a second, different, reference image 144 may be selected among the temporally successive images. This should be understood as corresponding to step F in FIG. 3. The second reference image 144 is different from the first reference image 113. The second reference image 144, like the first reference image 113, should be understood as an image which should be filtered using TNF.

In the embodiment of FIG. 1 the image 104 is selected from the temporally successive images 101, 102, 103, 104 as the second reference image 144. In the embodiment of FIG.

2 the image 102 is selected from the temporally successive images 101, 102, 103, 104 as the second reference image 144.

To facilitate TNF once again, a second plurality of images 152, 153 among the temporally successive images 101, 102, 103, 104 are selected to be used for temporal noise filtering of the second reference image 144. This time however, at least one of the images 152 of the second plurality of images 152, 153 is also comprised in the first plurality of images 121, 122. The second plurality of images 152, 153 also comprises the first reference image 113. This should be understood as corresponding to step G in FIG. 3. In the embodiment of FIG. 1, the second plurality of images 152, 153 are shown to temporally precede the selected second reference image 144, corresponding to images 102 and 103 of the temporally successive images 101, 102, 103, 104. In the embodiment of FIG. 2, the images of the second plurality of images 152, 153 are shown to both temporally precede and succeed the second reference image 144, corresponding to images 101 and 103 of the temporally successive images 101, 102, 103, 104. Other embodiments exist where the images of the second plurality of images 152, 153 both succeed the second reference image 144. The second plurality of images 152, 153 may comprise 4-8 images. FIG. 1 and FIG. 2 show embodiments where the second plurality of images 152, 153 comprising 2 images.

As disclosed, at least one of the images 152 of the second plurality of images 152, 153 is also comprised in the first plurality of images 121, 122. This may be understood as referring to any of the corresponding images based on the same selected images of the temporal successive images 101, 102, 103, 104. In the case of FIG. 1, this should be understood as any images based on the images 101 and 102. E.g. one or more images in the first plurality of transformed images 131, 132 may also be selected for the second plurality of images 152, 153, as indicated in FIG. 1 where transformed image 132 is selected as image 152 in the second plurality of images.

The method comprises a step of determining whether TNF of the second reference image should be performed or not. This should be understood as corresponding to step H in FIG. 3. Step H may be performed after selecting the second plurality of images 152, 153.

Step H may comprise determining a perspective difference between at least two images of the first plurality of images 121, 122. The perspective difference may alternatively be determined based on any of the temporally successive images 101, 102, 103, 104. TNF of the second reference image 144 may be performed upon determining that the perspective difference is less than or equal to a predetermined perspective difference threshold. TNF of the second reference image 144 should not be performed upon determining that the perspective difference is larger than the predetermined perspective difference threshold. Step H may in such cases be performed prior to steps F and G. If it is determined that TNF of the second reference image 144 is not to be performed, steps F and G may be omitted from the method altogether.

Step H may comprise determining a perspective difference between at least two images of the second plurality of images 121, 122. TNF of the second reference image 144 may be performed upon determining that the perspective difference is less than or equal to a predetermined perspective difference threshold. TNF of the second reference image 144 should not be performed upon determining that the perspective difference is larger than the predetermined perspective difference threshold.

The perspective difference may be based on motion data temporally associated with each image. The motion data may be determined by a motion sensor 210, an accelerometer 211, and/or a gyroscope 212. The perspective difference may be based on image data relating to how many pixels have changed between, directly or otherwise, subsequent images of the first plurality of images 121, 122, of the second plurality of images 152, 153, or of the temporally successive images 101, 102, 103, 104.

The predetermined perspective difference threshold may relate to a distinction whether the motion data or the image data is expected to be a result of a wearer of the camera 200 performing actions such as running, walking, or breathing. In one embodiment, TNF is performed upon determining certain types of low-activity actions, such as walking and/or breathing, and is not performed upon determining certain types of high-activity actions, such as running.

Motion data may be determined, and evaluated for determining if TNF should be performed or not, on a regular basis. Motion data may be determined at a rate matching a value for frames-per-second, FPS, at which the wearable camera 200 acquires the temporally successive images 101, 102, 103, 104. The value for FPS may preferably be in the range 1-60 and more preferably in the range 20-40.

The method may terminate after step H upon determining, during step H, that TNF of the second reference image 144 should not be performed. This would mean that steps I-J are not performed. The method may in such case start over at step A.

Upon determining, during step H, that TNF of the second reference image 144 should be performed, the method may proceed as shown in FIG. 3 with steps I-J.

The method proceeds by forming a second plurality of transformed images 162, 163. This should be understood as corresponding to step I. Step I comprises two partial steps dependent on how the images selected for the second plurality of images 152, 153 have been used previously in the method.

Each image 153 of the second plurality of images 152, 153 not comprised in the first plurality of images 121, 122, is transformed to have a same perspective as the second reference image 144, thus forming the transformed image 163. This should be understood as corresponding to the partial step I1.

For each image 152 of the second plurality of images 152, 153 also comprised in the first plurality of images 121, 122, a corresponding transformed image 132 (transformed in step D of FIG. 3) is transformed to have a same perspective as the second reference image 144, thus forming the transformed image 162. This should be understood as corresponding to the partial step I2. Transformed image 132 should be understood as temporally corresponding to images 122 and 152.

In FIG. 1 this correspondence relates to how they are all derived from image 102, of the temporally successive images 101, 102, 103, 104. In FIG. 2 images 122, 132, and 152 are all derived from image 103 of the temporally successive images 101, 102, 103, 104. The details of forming of the second plurality of transformed images 162, 163 may be similar to those of the forming of the first plurality of transformed images 131, 132 (step D) discussed in the above, e.g. in regard to using homography calculations and motion data.

According to the method, the same perspective transformation may be advantageously used for at least two images of the second plurality of images 152, 153 when forming the second plurality of transformed images 162, 163.

To summarize the difference between FIG. 1 and FIG. 2, these embodiments differ slightly in regard to the chronology or order of the first and second pluralities of images 121, 122, 152, 153, and their corresponding reference images 113, 144, FIG. 1 and FIG. 2.

FIG. 1 shows each image of the first plurality of images 121, 122 temporally preceding the first reference image 113, and each image of the second plurality of images 152, 153 temporally preceding the second reference image 144.

FIG. 2 indicates an alternate embodiment wherein the first reference image 113 temporally precedes the first plurality of images 121, 122. The second reference image 144 may similarly temporally precede the second plurality of images 152, 153, although this is not shown in FIG. 2.

FIG. 2 indicates that the second reference image 144 may be temporally sandwiched in between the images of the second plurality of image frames 152, 153. Similarly, the first reference image 113 may be temporally sandwiched in between the images of the first plurality of image frames 121, 122.

After forming the second plurality of transformed images 162, 163 TNF is performed on the second reference image 144 using the second plurality of transformed images 162, 163. The details relating to performing TNF on the second reference image 144 may be similar to those relating to performing TNF (step E) on the first reference image 113, discussed in the above.

The method may be used to form a temporally noise filtered video stream. In such cases, it is the reference images 113, 144 that will form a video stream. Every reference image 113, 144 may be associated with a different point in time in the video stream.

Figure 4:
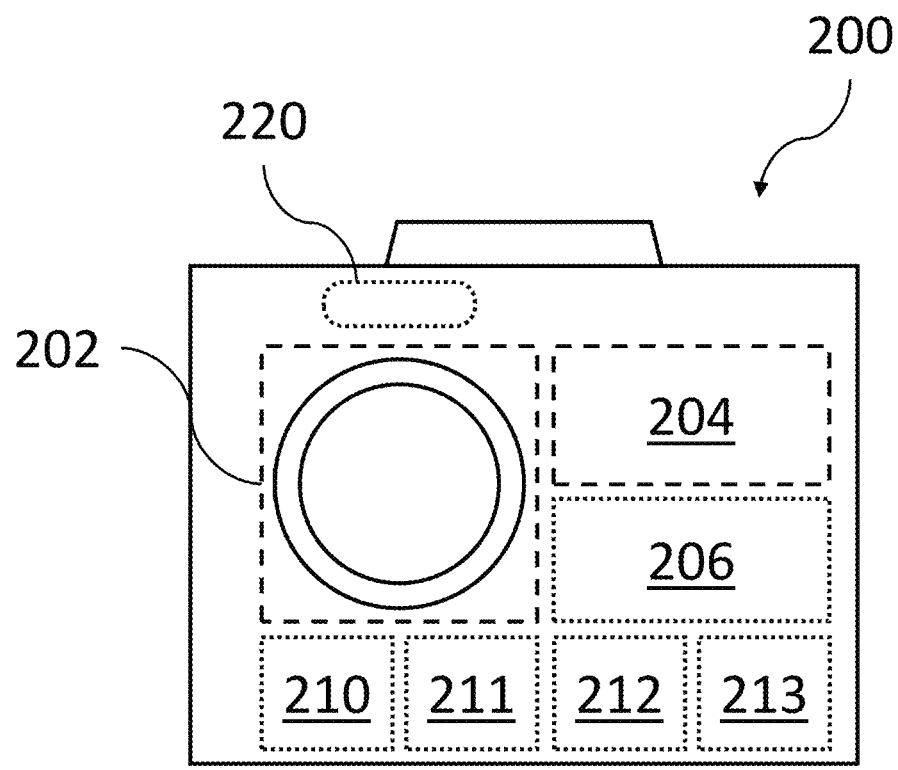
FIG. 4 schematically illustrates a wearable camera optionally in communication with a remote device.
Figure 4:
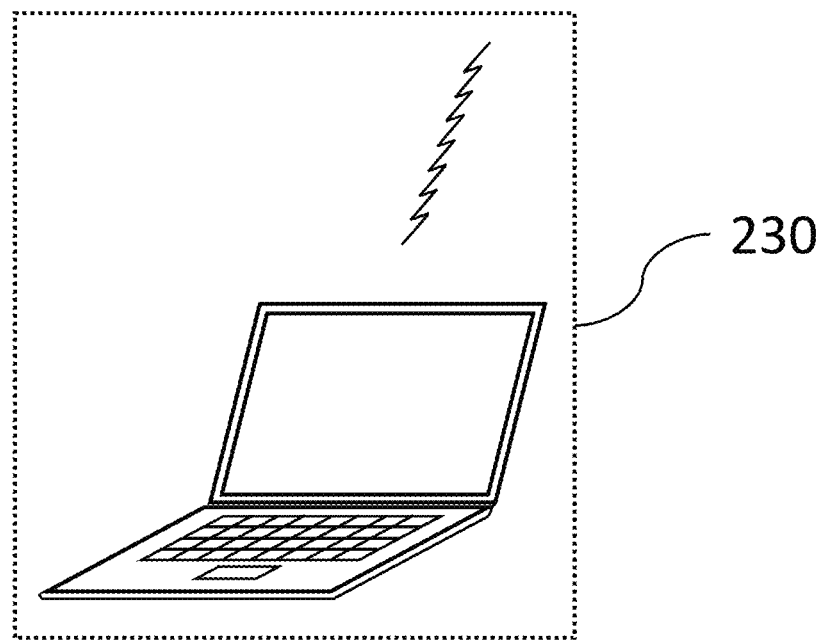

The method may be implemented in a wearable camera 200, as exemplified in FIG. 4. However, as described above, the method may also be performed in a device external to the wearable camera 200.

The method may comprise, prior to step A, determining a capture condition for the sequence of temporally successive images 101, 102, 103, 104. The steps A-J may in such cases only be performed upon determining that the capture condition meets a predetermined capture condition requirement. The method steps A-J may thus be considered to be delayed until the requirements are met.

The capture condition may be determined by a level of motion. The level of motion may be determined by a motion sensor 210, an accelerometer 211, a gyroscope 212, and/or a positioning device 213. The capture condition may be determined by a light level. The light level determined by a light sensor 220, or by image analysis.

The predetermined capture condition requirement may be a requirement of a light level being lower than a predetermined level. Such a predetermined level may be in the range 50-200 lux. The predetermined level may more preferably be in the range 75-125 lux, for example 100 lux. Higher light level values may be associated with less noise, hence mitigating the need for TNF for these higher light level values.

The predetermined capture condition requirement may be a requirement of the light level being higher than a predetermined level. The predetermined capture condition requirement may further include both a lowest acceptable light level and a highest acceptable light level. The predetermined capture condition requirement may include an intermediate light level exclusion range, with light levels outside of this range being acceptable.

The method may further comprise storing the first reference image 113 on a memory 206 of the wearable camera 200 after performing TNF on the first reference image 113. The method may comprise storing the second reference image 144 on the memory 206 of the wearable camera 200 after performing TNF on the second reference image 144.

The method may further comprise deleting one of the temporally successive images 101, 102, 103, 104 from a memory 206 of the wearable camera 200 after transforming said one of the temporally successive images 101, 102, 103, 104 to have the same perspective as the first or the second reference image 113, 144.

The method may further comprise transmitting the first reference image 113 from the wearable camera 200 to a remote device 230 after performing TNF on the first reference image 113. The method may comprise transmitting the second reference image 144 from the wearable camera 200 to the remote device 230 after performing TNF on the second reference image 144.

The method may be implemented by a computer, decoder or another device with processing capabilities. A non-transitory computer-readable storage medium may be provided with instructions stored thereon for implementing the method, when executed by a device having processing capabilities.

FIG. 4 shows the wearable camera 200 comprising an image capturing unit 202 and a computing unit 204. The wearable camera 200 may be configured for performing the above described methods and method steps.

The image capturing unit 202 may be understood as any device capable of capturing images. The image capturing unit 202 may comprise a charge-coupled device, CCD, image sensor or a complementary metal-oxide-semiconductor, CMOS, based active-pixel image sensor.

The computing unit 204 may comprise any device capable of performing processing and calculations according to the method. The computing unit may itself comprise several subunits for performing different actions or steps of the method.

The wearable camera 200 may be worn by a wearer of the wearable camera. The wearer of the wearable camera 200 may be a human. The wearer of the wearable camera 200 may be a law enforcement professional. Further examples of wearers of the wearable camera 200 include security personnel and individuals performing activities in hazardous environments, e.g. at a road construction site. The wearer of the wearable camera 200 may be a professional or amateur photographer/video camera operator, recording for aesthetic, documentary, athletic, or recreational purposes. For some uses, e.g. by law enforcement personnel, camera battery longevity and detail capture quality may be more desirable. For other uses e.g. recreational/aesthetic purposes colors capture and cognitive ease of viewing may be more desirable.

The wearer may alternatively be an animal such as e.g. a dog, a cat, or a horse. The wearer may be a service animal such as e.g. a law enforcement animal. Law enforcement animals may include e.g. police dogs trained to detect illegal substances or police horses deployed for crowd control missions. The wearer may be a hunting dog. The wearer may be a wild animal provided with the wearable camera 200 for monitoring or scientific purposes. The wearer may be a pet animal. The wearer may be provided with the wearable camera 200 to prevent the wearer from running away, getting lost, or getting injured.

The wearable camera 200 may be mounted on the wearer a strap or harness. The wearable camera 200 may alternatively be fixedly mounted onto a piece of clothing, or protective equipment such as e.g. a helmet or vest.

The wearable camera 200 may comprise a motion sensor 210, as shown in FIG. 4, configured to determine any type of motion of the wearable camera 200. The wearable camera 200 may comprise an accelerometer 211, as shown in FIG. 4, configured to determine an acceleration, a velocity, and/or a direction of movement of the wearable camera 200. The wearable camera 200 may comprise a gyroscope 212, as shown in FIG. 4, configured to determine an orientation of the wearable camera 200. The wearable camera 200 may comprise a positioning device 213, as shown in FIG. 4, configured to determine a position, a velocity, and/or a direction of movement of the wearable camera 200. The positioning device 213 may comprise a GNSS sensor or receiver. The positioning device 213 may comprise an inertial navigation system. The wearable camera 200 may comprise a compass configured to determine an orientation of the camera. The wearable camera 200 may comprise a light sensor 220 (photodetector), as shown in FIG. 4, configured to determine a light condition or a light level of the wearable camera 200. The wearable camera 200 may be configured for communication with a remote device 230, as shown in FIG. 4. The communication may be wireless or wired.

The present disclosure further relates to pan/tilt cameras and in particular methods for noise reduction in images captured by a pan/tilt camera.

Similar issues as disclosed for wearable cameras may arise for pan/tilt cameras.

An object of the present disclosure is to at least mitigate some of the above issues and to provide improved noise reduction for pan/tilt cameras.

According to a fourth aspect of the present disclosure there is provided a method of noise reduction in images captured by a pan/tilt camera, the method comprising:
A. providing a sequence of temporally successive images,
B. selecting a first reference image among the temporally successive images,
C. selecting a first plurality of images among the temporally successive images to be used for temporal noise filtering of the first reference image,
D. forming a first plurality of transformed images by transforming each of the first plurality of images to have a same perspective as the first reference image,
E. performing temporal noise filtering, TNF, on the first reference image using the first plurality of transformed images,
F. selecting a second, different, reference image among the temporally successive images,
G. selecting a second plurality of images among the temporally successive images to be used for temporal noise filtering of the second reference image, wherein at least one of the images of the second plurality of images is also comprised in the first plurality of images, wherein the second plurality of images comprises the first reference image,
H. determining whether TNF of the second reference image should be performed or not, wherein upon determining that TNF should be performed, the method further comprises:
I. forming a second plurality of transformed images by:
  I1. for each image of the second plurality of images not comprised in the first plurality of images, transforming said image to have a same perspective as the second reference image;
  I2. for each image of the second plurality of images also comprised in the first plurality of images, transforming the corresponding transformed image among the first plurality of transformed images to have a same perspective as the second reference image;
J. performing temporal noise filtering on the second reference image using the second plurality of transformed images.

The term "pan/tilt camera" may be understood as a camera configured to, when in use, being fixedly mounted and possible to pan and tilt, thereby capturing different fields of view. Fixedly mounted pan/tilt cameras used for monitoring or surveillance which can be manually or automatically controlled to be panned and/or tilted in order to capture different fields of view should be considered as non-limiting examples of the term pan/tilt camera. Pan/tilt cameras may also include a zooming function and may then be referred to as pan-tilt-zoom cameras or PTZ cameras.

The term "temporally successive images" may be understood as images or image frames captured successively, at different points in time. In other words, a first image is captured previous in time compared to the time of capture for a second image, which in turn is captured previous in time compared to the time of capture for a third image, etc. The images or image frames may together form a sequence of temporally successive images or image frames of a video stream.

The term "transforming . . . images to have a same perspective" may refer to transforming an image or creating a projection of the image as if it was captured with the camera located and oriented in the same way as when it captured another image. The wording should be understood as referring to a substantially same perspective. Various ways to achieve perspective transformation may include using homography and image projection. Readings from sensors such as e.g. accelerometers and gyroscopes may be employed to conduct the perspective transformation. Perspective transform may comprise calculating a homography based on pairs of corresponding candidate points in two different images.

Note that the steps A-J may not need to be performed temporally in the order in which they are presented in this disclosure. Steps 11 and 12 should be understood as both being parts of step I.

The above method provides a way to optimize TNF of images captured by a pan/tilt camera. In particular, the method may reduce computational effort and energy use. This is achieved by creating a process flow where the second transforming step may benefit from being able to reuse the same perspective transform for at least two images when forming the second plurality of transformed images. This should be understood as being the case since at least one of the first plurality of transformed images and the first reference image are present in the second plurality of images, enabling the use of a same perspective transform when transforming these images to the same perspective transform as the second reference image. This means that less new perspective transforms may need to be calculated/determined when producing the second plurality of transformed images. Furthermore, reuse of instructions for performing the perspective transforms may reduce the amount of storage or cache storage required for transforming the images.

The present disclosure should be understood in such a way that repeated iteration of the provided method advantageously enables greater reuse of perspective transforms e.g. for video streams comprising large numbers of temporally successive images.

The gains of effort reduction will become more significant as the process is scaled up through continuous iteration, as would be the case when performing the method on a continuous stream of images, i.e. video.

According to some embodiments of the fourth aspect the method may further comprise deleting one of the temporally successive images from a memory of the pan/tilt camera after transforming said one of the temporally successive images to have the same perspective as the first or the second reference image.

An advantageous effect of such embodiments may be that of reducing the computer memory requirements. This is possible as according to the method the original perspective images may be superfluous once they have been transformed to feature another image perspective, since the transformed images are in fact used if needed for performing TNF on other images among the temporally successive images (see e.g. step I2).

According to some embodiments of the fourth aspect each image of the first plurality of images may temporally precede the first reference image, and each image of the second plurality of images temporally may precede the second reference image.

By such embodiments, latency may be reduced. This is the case as only temporally preceding image information is used for the TNF of reference images meaning the delay between providing an image and performing TNF on the same is reduced. Reducing latency may be particularly advantageous when the method is applied for live video streams.

According to some embodiments of the fourth aspect the first plurality of images may comprise 4-8 images, and wherein the second plurality of images may comprise 4-8 images.

The more images that are used for TNF may generally improve the results of the noise reduction method. More images also enable greater reuse of perspective transforms. However, the computational complexity of the TNF is generally increased when more images are used. The range of images according to this embodiment represents a good consideration between the quality of TNF and the computational complexity.

According to some embodiments of the fourth aspect, forming the first plurality of transformed images and forming the second plurality of transformed images may comprise transforming images to have a same perspective as the associated reference image based on comparing motion data associated with each image in the sequence of temporally successive images.

The term "motion data" may refer to any data or information regarding the physical movement of the camera relative to the scene it monitors.

Such embodiments provide flexibility for performing the method as various types of motion data may exist and a wide array of means for determining the motion data may be applicable.

According to some embodiments of the fourth aspect the motion data associated with each image in the sequence of temporally successive images may be pan/tilt data comprising values of a panning and a tilting of the pan/tilt camera associated with each image in the sequence of temporally successive images. The values of the panning and the tilting associated with an image may be absolute values, i.e. values in relation to a coordinate system fixed in relation to the pan/tilt camera, or relative values, i.e. in relation to a panning and tilting of the pan/tilt camera associated with a different image.

According to some embodiments of the fourth aspect step H may further comprise determining a perspective difference between at least two images of the first plurality of images, wherein TNF of the second reference image is performed upon determining that the perspective difference is less than or equal to a predetermined perspective difference threshold, and wherein TNF of the second reference image is not performed upon determining that the perspective difference is larger than the predetermined perspective difference threshold.

It may be preferable to only perform TNF if the motion is within certain compliance limits. TNF relies on averaging temporally successive images. Performing TNF on successive images comprising too much motion may result in distortion of image details. In such cases it may be advantageous to not go through the effort of performing the second round of TNF at all. Furthermore, this may also provide an advantageous effect in reducing the computational effort required by essentially not going through the rest of the noise reduction steps as long as the motion is too large.

According to some embodiments of the fourth aspect the perspective difference is based on pan/tilt data temporally associated with each image, the pan/tilt data comprising values of a panning and a tilting of the pan/tilt camera associated with each image in the sequence of temporally successive images.

The values of the panning and the tilting of the pan/tilt camera associated with an image may be in relation to a coordinate system fixed in relation to the pan/tilt camera or it may be in relation to a panning and a tilting of the pan/tilt camera associated with a different image.

By using pan/tilt data comprising values of a panning and a tilting of the pan/tilt camera, the determination of the perspective difference may be made very accurate.

According to some embodiments of the fourth aspect the method may further comprise, prior to step A, determining a capture condition for the sequence of temporally successive images, wherein the steps A-J are only performed upon determining that the capture condition meets a predetermined capture condition requirement.

It may be preferable to only perform TNF if the capture conditions are within certain compliance limits. It may be understood that certain image capture conditions are not suitable for TNF due to expected image detail distortion. It may therefore be advantageous to check whether capture conditions are favorable, or at least acceptable, before performing the steps of the method. Similar to above embodiments, this may also provide advantageous effects in reducing the computational effort required by essentially not going through the rest of the method steps as long as the capture conditions are not meeting the predetermined capture condition requirement.

According to some embodiments of the fourth aspect the capture condition is determined by at least one of:
  a level of motion determined by pan/tilt data comprising values of a panning and a tilting of the pan/tilt camera associated with different points in time; and
  a light level determined by a light sensor or by image analysis.

It may be preferable to not perform the method steps A-J if the level of motion is too high. This may be understood as similar to the embodiments discussed in the above wherein the second round of TNF is not performed when motion is too large and expected to distort image details. A too high level of motion may reduce the viability of successful perspective transform i.e. causing the transformed images to be distorted. A too high level of motion may also reduce the viability of successful TNF by the reduced number of common pixels between temporally successive images.

It may also be preferable to not perform the method steps A-J based on the light level. TNF may give rise to image detail distortion when applied on low light images, why it may be favorable to avoid the method steps A-J altogether if the light level is unsatisfactory. If on the other hand the light level is too high TNF may not be required or necessary. TNF may thus be advantageously avoided.

If the light level exceeds predetermined thresholds it may further be established that there is no need for the motion level to be recorded. Thus, sensors and means for recording motion, motion data, and/or motion levels may be turned off to reduce energy consumption.

Light level and level of motion may be combined, e.g. as a figure of merit, or evaluated in combination, for determining the capture condition.

According to some embodiments of the fourth aspect the capture condition is determined by a light level determined by a light sensor or by image analysis, wherein the predetermined capture condition requirement is a light level lower than a predetermined level.

TNF may generally be more necessary in low light conditions. This may be due to cameras or image sensors often exhibiting lower signal-to-noise ratios in low light conditions. As such, an upper threshold for performing the method steps A-J may be preferable.

According to some embodiments of the fourth aspect the method may further comprise storing the first reference image on a memory of the pan/tilt camera after performing TNF on the first reference image and storing the second reference image on the memory of the pan/tilt camera after performing TNF on the second reference image.

The reference images, on which TNF has been performed, may thus form a final video stream that may be stored on the memory of the pan/tilt camera.

According to some embodiments of the fourth aspect the method may further comprise transmitting the first reference image from the pan/tilt camera to a remote device after performing TNF on the first reference image and transmitting the second reference image from the pan/tilt camera to the remote device after performing TNF on the second reference image.

The reference images, on which TNF has been performed, may thus form a final video stream being transmitted to a remote device for display or storage. Advantageously, the reference images may thus not need to be stored for extended periods on a memory of the pan/tilt camera.

According to a fifth aspect of the present disclosure there is provided a pan-tilt-zoom, pan/tilt, camera comprising an image capturing unit and a computing unit, the pan/tilt camera being configured for:
   a. capturing, by the image capturing unit, a sequence of temporally successive images,
   b. selecting, by the computing unit, a first reference image among the temporally successive images,
   c. selecting, by the computing unit, a first plurality of images among the temporally successive images to be used for temporal noise filtering of the first reference image,
   d. forming, by the computing unit, a first plurality of transformed images by transforming each of the first plurality of images to have a same perspective as the first reference image,
   e. performing, by the computing unit, temporal noise filtering, TNF, on the first reference image using the first plurality of transformed images,
   f. selecting, by the computing unit, a second, different, reference image among the temporally successive images,
   g. selecting, by the computing unit, a second plurality of images among the temporally successive images to be used for temporal noise filtering of the second reference image, wherein at least one of the images of the second plurality of images is also comprised in the first plurality of images, wherein the second plurality of images comprises the first reference image,
   h. determining, by the computing unit, whether TNF of the second reference image should be performed or not, wherein upon determining that TNF should be performed, the method further comprises:
   i. forming, by the computing unit, a second plurality of transformed images by:
      i1. for each image of the second plurality of images not comprised in the first plurality of images, transforming said image to have a same perspective as the second reference image;
      i2. for each image of the second plurality of images also comprised in the first plurality of images, transforming the corresponding transformed image among the first plurality of transformed images to have a same perspective as the second reference image;
   j. performing, by the computing unit, temporal noise filtering on the second reference image using the second plurality of transformed images.

The pan/tilt camera described in the fifth aspect provides similar advantages as those of the method described in the fourth aspect due to their corresponding features. The pan/tilt camera may be considered as a device configured for implementing the methods of the fourth aspect.

According to a sixth aspect of the present disclosure there is provided a non-transitory computer-readable storage medium having stored thereon instructions for implementing the methods of the fourth aspect, when executed by a device having processing capabilities.

The non-transitory computer-readable storage medium described in the sixth aspect provides similar advantages as those of the method described in the fourth aspect.

The fourth, fifth, and sixth aspects of the present disclosure will now be described more fully hereinafter with reference to FIG. 1, FIG. 2, FIG. 3, and FIG. 5, in which currently preferred embodiments in relation to the fourth, fifth, and sixth aspects of the present disclosure. These aspects may, however, be embodied in many different forms and should not be construed as limited to the embodiments set forth herein; rather, these embodiments are provided for thoroughness and completeness, and to fully convey the scope of these aspects to the skilled person.

FIG. 1 and FIG. 2 illustrate methods of noise reduction in images captured by a pan/tilt camera. FIG. 3 illustrates a flowchart for the same method of noise reduction in images captured by a pan/tilt camera. The method comprises the steps A-J. The method may be implemented in a pan/tilt camera 300, as exemplified in FIG. 5.

The method of FIG. 1, FIG. 2 and FIG. 3 will now be explained in conjunction with the pan/tilt camera 300 of FIG. 5. Reference numerals beginning with the FIG. 1, e.g. 113, refer to images shown in FIG. 1 and FIG. 2. Reference numerals beginning with the FIG. 3, e.g. 302, refer to features shown in FIG. 5.

The blocks shown in FIG. 1 and FIG. 2 represent images or image frames. FIG. 1 and FIG. 2 contain a horizontal time component, relating to when the original images, i.e. the temporally successive images 101, 102, 103, 104 are provided or captured. Blocks located at different horizontal positions within the figures indicate that the images are captured or provided at different points in time. Time t is shown to progress from the left to the right of the figures, i.e. block 101, one of the temporally successive images, is provided or captured before the rest of the temporally successive images 102, 103, 104. The temporally successive images 101, 102, 103, 104 may be provided as raw format images from an image sensor device, i.e. there is no previous image processing of the images before being provided. Alternatively, the present method may be preceded by image processing of the temporally successive images 101, 102, 103, 104 before being provided as input to the method. Non-limiting examples of preceding image processing includes and image data adjustment or correction such as defect pixel removal and column fixed pattern noise filtering. In other words, the temporally successive images 101, 102, 103, 104 may be provided as raw image data or as processed image data. It is however noted that the method according to the present disclosure is performed before a video encoding process of the images, i.e. the temporally successive images 101, 102, 103, 104 are unencoded/not video encoded.

FIG. 1 and FIG. 2 further contain a vertical/column component. Images located below others, in a same column, indicate that they are selected, processed, transformed, or filtered versions of above images in that same column. These below images do not have to correspond to any temporal order of processing/transforming etc. and may be processed/transformed etc. at arbitrary points in time. These images should rather be understood as being primarily based on their above temporally successive images 101, 102, 103, 104.

In FIG. 1 and FIG. 2, temporally successive images 101, 102, 103, 104 are provided in the top row. This should be understood as corresponding to step A of the method in FIG. 3.

It should be noted that step A in relation to the fifth aspect of the disclosure, i.e. the aspect providing a pan/tilt camera 300, specifies that the pan/tilt camera 300 is configured for capturing, by an image capturing unit 302, a sequence of temporally successive images 101, 102, 103, 104 while step A in the fourth aspect, i.e. the aspect providing a method (shown in FIG. 3), specifies providing a sequence of temporally successive images 101, 102, 103, 104. Both these aspects may still be considered as interrelated to each other. The pan/tilt camera 300 of the fifth aspect uses its own image capturing unit 302 to capture the sequence of temporally successive images 101, 102, 103, 104 while the method of the fourth aspect does not require a camera per se to capture the temporally successive images 101, 102, 103, 104. The method may be performed remotely from the pan/tilt camera 300 capturing the images, thus only requiring the temporally successive images 101, 102, 103, 104 to be provided.

The method may be performed by, or in, a pan/tilt camera 300. The step A may be performed by the image capturing unit 302 of the pan/tilt camera 300. The steps B-J may be performed by a computing unit 304 of the pan/tilt camera 300.

A first reference image 113 is selected among the temporally successive images 101, 102, 103, 104. This should be understood as corresponding to step B. The first reference image 113 should be understood as an image which should be filtered using TNF. In FIG. 1 the image 103 is selected from the temporally successive images 101, 102, 103, 104 as the first reference image 113. In FIG. 2 the image 101 is selected from the temporally successive images 101, 102, 103, 104 as the first reference image 113.

To facilitate TNF, a first plurality of images 121, 122 among the temporally successive images 101, 102, 103, 104 are selected to be used for temporal noise filtering of the first reference image 113. This should be understood as corresponding to step C. In FIG. 1, the first plurality of images 121, 122 is shown to temporally precede the selected first reference image 113, corresponding to images 101 and 102 of the temporally successive images 101, 102, 103, 104. In FIG. 2, the first plurality of images 121, 122 is shown to temporally succeed the selected first reference image 113, corresponding to images 102 and 103 of the temporally successive images 101, 102, 103, 104. Other embodiments exist where the first plurality of images 121, 122 is selected both from images preceding and succeeding the first reference image 113. It may be beneficial that the first plurality of images 121, 122 may comprise 4-8 images. To facilitate the understanding of the general concept, FIG. 1 and FIG. 2 show the first plurality of images 121, 122 comprising 2 images. The skilled person, familiar with TNF, has the knowledge for applying the herein disclosed concept on any (reasonable) number of images.

After the first plurality of images 121, 122 has been selected, a first plurality of transformed images 131, 132 is formed by transforming each of the first plurality of images 121, 122 to have a same perspective as the first reference image 113. This should be understood as corresponding to step D.

The transformation step D may be performed using homography. The transforming step D may comprise calculating a homography based on pairs of corresponding candidate points in two different images. For homography, images captured at different points in time may be considered as images captured from different cameras in a stereo camera arrangement for purposes of producing a homography matrix.

The transforming step D may be based on comparing motion data associated with each image in the sequence of temporally successive images 101, 102, 103, 104. Motion data associated with each image in the sequence of temporally successive images 101, 102, 103, 104 may be pan/tilt data comprising values of a panning and a tilting of the pan/tilt camera 300 associated with each image in the sequence of temporally successive images.

By means of comparing values of a panning and a tilting of the pan/tilt camera 300 at the time of capturing the first reference image 113 to values of a panning and a tilting of the pan/tilt camera 300 at the time of capturing of each image of the first plurality of images 121, 122, a transform may be determined for transforming each of the first plurality of images 121, 122 to have a same perspective as the first reference image 113 thereby forming the first plurality of transformed images 131, 132.

The pan/tilt data may be obtained from a pan/tilt controller, such as a pan/tilt control function in the computing unit 304, controlling the pan/tilt camera to a desired panning and tilting. The pan/tilt data comprising the values of a panning and a tilting of the pan/tilt camera associated with an image may relate to values of a panning and a tilting of the pan/tilt camera 300 according to the desired panning and tilting of the pan/tilt camera 300 at a time of capturing the image. The pan/tilt data may further be corrected by means of a deviation from the desired panning and tilting as identified by a pan/tilt sensor at the time of capturing the image as indicated in feedback from pan/tilt sensor.

The values of the panning and the tilting associated with an image may be absolute values, i.e. values in relation to a coordinate system fixed in relation to the pan/tilt camera, or relative values, i.e. in relation to a panning and tilting of the pan/tilt camera associated with a different image.

In FIG. 1 and FIG. 2, blocks labelled PT indicate that a perspective transform is being performed. This works by having a base image being transformed to have the same perspective as an image from a different vertical column, indicated by a dashed arrow pointing towards the PT block. The base image is shown to be transformed by the PT block by solid arrows. Sometimes, the same PT block may be used for transforming several images, as is the case when the images of the second plurality of images 152, 153 are transformed to form the second plurality of transformed images 162, 163 (see further below). In this case, the image 152 may be understood as the base image for the transformed image 162. This same logic may apply to image 153 and its transformed counterpart image 163.

After forming the first plurality of transformed images 131, 132, TNF of the first reference image 113 may be performed, using the first plurality of transformed images 131, 132. This should be understood as corresponding to step E in FIG. 3.

In FIG. 1 and FIG. 2, blocks labelled TNF indicate that a temporal noise filtering step is being performed. In these cases, the base image, in which noise filtering is to be performed, is indicated by dashed and dotted arrows. The dashed arrows pointing towards the TNF block indicate images from different vertical columns that are used in the temporal noise filtering process. The TNF process may e.g. include averaging of image content from images captured at different points in time. Generally, the figures illustratively describe transforming images to have a same perspective before performing temporal noise filtering.

In the figures the reference numerals may be the same before and after performing the TNF steps. This may be motivated by the first and second reference images 113, 144 being raw/unfiltered prior to/above the noise filtering steps, and as essentially the same images after/below the noise filtering steps, albeit ideally with less noise. For the later steps of the method, i.e. from step F, both the raw/unfiltered or the temporally noise filtered reference images 113, 144 may be used.

After performing TNF on the first reference image 113, a second, different, reference image 144 may be selected among the temporally successive images. This should be understood as corresponding to step F in FIG. 3. The second reference image 144 is different from the first reference image 113. The second reference image 144, like the first reference image 113, should be understood as an image which should be filtered using TNF.

In the embodiment of FIG. 1 the image 104 is selected from the temporally successive images 101, 102, 103, 104 as the second reference image 144. In the embodiment of FIG. 2 the image 102 is selected from the temporally successive images 101, 102, 103, 104 as the second reference image 144.

To facilitate TNF once again, a second plurality of images 152, 153 among the temporally successive images 101, 102, 103, 104 are selected to be used for temporal noise filtering of the second reference image 144. This time however, at least one of the images 152 of the second plurality of images 152, 153 is also comprised in the first plurality of images 121, 122. The second plurality of images 152, 153 also comprises the first reference image 113. This should be understood as corresponding to step G in FIG. 3. In the embodiment of FIG. 1, the second plurality of images 152, 153 are shown to temporally precede the selected second reference image 144, corresponding to images 102 and 103 of the temporally successive images 101, 102, 103, 104. In the embodiment of FIG. 2, the images of the second plurality of images 152, 153 are shown to both temporally precede and succeed the second reference image 144, corresponding to images 101 and 103 of the temporally successive images 101, 102, 103, 104. Other embodiments exist where the images of the second plurality of images 152, 153 both succeed the second reference image 144. The second plurality of images 152, 153 may comprise 4-8 images. FIG. 1 and FIG. 2 show embodiments where the second plurality of images 152, 153 comprising 2 images.

As disclosed, at least one of the images 152 of the second plurality of images 152, 153 is also comprised in the first plurality of images 121, 122. This may be understood as referring to any of the corresponding images based on the same selected images of the temporal successive images 101, 102, 103, 104. In the case of FIG. 1, this should be understood as any images based on the images 101 and 102. E.g. one or more images in the first plurality of transformed images 131, 132 may also be selected for the second plurality of images 152, 153, as indicated in FIG. 1 where transformed image 132 is selected as image 152 in the second plurality of images.

The method comprises a step of determining whether TNF of the second reference image should be performed or not. This should be understood as corresponding to step H in FIG. 3. Step H may be performed after selecting the second plurality of images 152, 153.

Step H may comprise determining a perspective difference between at least two images of the first plurality of images 121, 122. The perspective difference may alternatively be determined based on any of the temporally successive images 101, 102, 103, 104. TNF of the second reference image 144 may be performed upon determining that the perspective difference is less than or equal to a predetermined perspective difference threshold. TNF of the second reference image 144 should not be performed upon determining that the perspective difference is larger than the predetermined perspective difference threshold. Step H may in such cases be performed prior to steps F and G. If it is determined that TNF of the second reference image 144 is not to be performed, steps F and G may be omitted from the method altogether.

Step H may comprise determining a perspective difference between at least two images of the second plurality of images 121, 122. TNF of the second reference image 144 may be performed upon determining that the perspective difference is less than or equal to a predetermined perspective difference threshold. TNF of the second reference image 144 should not be performed upon determining that the perspective difference is larger than the predetermined perspective difference threshold.

The perspective difference may be based on motion data temporally associated with each image. The motion data may be pan/tilt data comprising values of a panning and a tilting of the pan/tilt camera 300 associated with each image of the at least two images of the second plurality of images 121, 122.

The pan/tilt data may be obtained from a pan/tilt controller, such as a pan/tilt control function in the computing unit 304, controlling the pan/tilt camera to a desired panning and tilting. The pan/tilt data comprising the values of a panning and a tilting of the pan/tilt camera associated with an image may relate to values of a panning and a tilting of the pan/tilt camera 300 according to the desired panning and tilting of the pan/tilt camera 300 at a time of capturing the image. The pan/tilt data may further be corrected by means of a deviation from the desired panning and tilting as identified by a pan/tilt sensor at the time of capturing the image as indicated in feedback from pan/tilt sensor.

The values of the panning and the tilting associated with an image may be absolute values, i.e. values in relation to a coordinate system fixed in relation to the pan/tilt camera, or relative values, i.e. in relation to a panning and tilting of the pan/tilt camera associated with a different image.

Motion data may be determined and evaluated for determining if TNF should be performed or not, on a regular basis. Motion data may be determined at a rate matching a value for frames-per-second, FPS, at which the pan/tilt camera 300 acquires the temporally successive images 101, 102, 103, 104. The value for FPS may preferably be in the range 1-60 and more preferably in the range 20-40.

The method may terminate after step H upon determining, during step H, that TNF of the second reference image 144 should not be performed. This would mean that steps I-J are not performed. The method may in such case start over at step A.

Upon determining, during step H, that TNF of the second reference image 144 should be performed, the method may proceed as shown in FIG. 3 with steps I-J.

The method proceeds by forming a second plurality of transformed images 162, 163. This should be understood as corresponding to step I. Step I comprises two partial steps dependent on how the images selected for the second plurality of images 152, 153 have been used previously in the method.

Each image 153 of the second plurality of images 152, 153 not comprised in the first plurality of images 121, 122, is transformed to have a same perspective as the second reference image 144, thus forming the transformed image 163. This should be understood as corresponding to the partial step I1.

For each image 152 of the second plurality of images 152, 153 also comprised in the first plurality of images 121, 122, a corresponding transformed image 132 (transformed in step D of FIG. 3) is transformed to have a same perspective as the second reference image 144, thus forming the transformed image 162. This should be understood as corresponding to the partial step I2. Transformed image 132 should be understood as temporally corresponding to images 122 and 152.

In FIG. 1 this correspondence relates to how they are all derived from image 102, of the temporally successive images 101, 102, 103, 104. In FIG. 2 images 122, 132, and 152 are all derived from image 103 of the temporally successive images 101, 102, 103, 104. The details of forming of the second plurality of transformed images 162, 163 may be similar to those of the forming of the first plurality of transformed images 131, 132 (step D) discussed in the above, e.g. in regard to using homography calculations and motion data.

According to the method, the same perspective transformation may be advantageously used for at least two images of the second plurality of images 152, 153 when forming the second plurality of transformed images 162, 163. To summarize the difference between FIG. 1 and FIG. 2, these embodiments differ slightly in regard to the chronology or order of the first and second pluralities of images 121, 122, 152, 153, and their corresponding reference images 113, 144, FIG. 1 and FIG. 2.

FIG. 1 shows each image of the first plurality of images 121, 122 temporally preceding the first reference image 113, and each image of the second plurality of images 152, 153 temporally preceding the second reference image 144.

FIG. 2 indicates an alternate embodiment wherein the first reference image 113 temporally precedes the first plurality of images 121, 122. The second reference image 144 may similarly temporally precede the second plurality of images 152, 153, although this is not shown in FIG. 2.

FIG. 2 indicates that the second reference image 144 may be temporally sandwiched in between the images of the second plurality of image frames 152, 153. Similarly, the first reference image 113 may be temporally sandwiched in between the images of the first plurality of image frames 121, 122.

After forming the second plurality of transformed images 162, 163 TNF is performed on the second reference image 144 using the second plurality of transformed images 162, 163. The details relating to performing TNF on the second reference image 144 may be similar to those relating to performing TNF (step E) on the first reference image 113, discussed in the above.

The method may be used to form a temporally noise filtered video stream. In such cases, it is the reference images 113, 144 that will form a video stream. Every reference image 113, 144 may be associated with a different point in time in the video stream.

Figure 5:
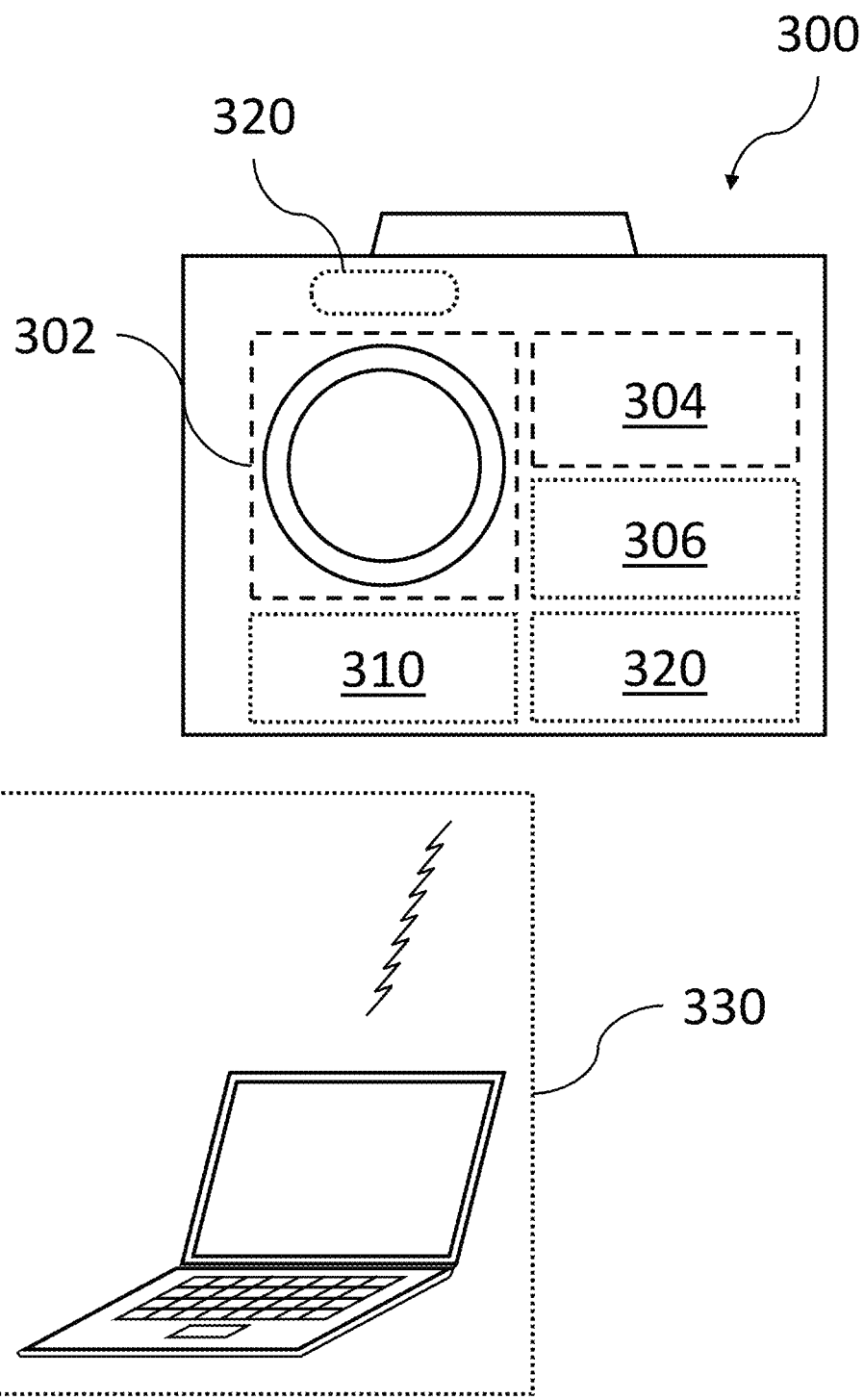
FIG. 5 schematically illustrates a pan/tilt camera optionally in communication with a remote device.

The method may be implemented in a pan/tilt camera 300, as exemplified in FIG. 5. However, as described above, the method may also be performed in a device external to the pan/tilt camera 300.

The method may comprise, prior to step A, determining a capture condition for the sequence of temporally successive images 101, 102, 103, 104. The steps A-J may in such cases only be performed upon determining that the capture condition meets a predetermined capture condition requirement. The method steps A-J may thus be considered to be delayed until the requirements are met.

The capture condition may be determined by a level of motion. The level of motion may be determined from pan/tilt data comprising values of a panning and tilting of the pan/tilt camera 300 associated with different points in time, such as points in time when images are captured or arbitrary points in time. The capture condition may be determined by a light level. The light level determined by a light sensor 220, or by image analysis.

The pan/tilt data may be obtained from a pan/tilt controller, such as a pan/tilt control function in the computing unit 304, controlling the pan/tilt camera to a desired panning and tilting. The pan/tilt data comprising the values of a panning and a tilting of the pan/tilt camera associated with a point in time may relate to values of a panning and a tilting of the pan/tilt camera 300 according to the desired panning and tilting of the pan/tilt camera 300 at that point in time. The pan/tilt data may further be corrected by means of a deviation from the desired panning and tilting as identified by a pan/tilt sensor at that point in time as indicated in feedback from pan/tilt sensor.

The values of the panning and the tilting associated with a point in time may be absolute values, i.e. values in relation to a coordinate system fixed in relation to the pan/tilt camera, or relative values, i.e. in relation to a panning and tilting of the pan/tilt camera associated with a different point in time.

The predetermined capture condition requirement may be a requirement of a light level being lower than a predetermined level. Such a predetermined level may be in the range 50-200 lux. The predetermined level may more preferably be in the range 75-125 lux, for example 100 lux. Higher light level values may be associated with less noise, hence mitigating the need for TNF for these higher light level values.

The predetermined capture condition requirement may be a requirement of the light level being higher than a predetermined level. The predetermined capture condition requirement may further include both a lowest acceptable light level and a highest acceptable light level. The predetermined capture condition requirement may include an intermediate light level exclusion range, with light levels outside of this range being acceptable.

The method may further comprise storing the first reference image 113 on a memory 306 of the pan/tilt camera 300 after performing TNF on the first reference image 113. The method may comprise storing the second reference image 144 on the memory 306 of the pan/tilt camera 300 after performing TNF on the second reference image 144.

The method may further comprise deleting one of the temporally successive images 101, 102, 103, 104 from a memory 306 of the pan/tilt camera 300 after transforming said one of the temporally successive images 101, 102, 103, 104 to have the same perspective as the first or the second reference image 113, 144.

The method may further comprise transmitting the first reference image 113 from the pan/tilt camera 300 to a remote device 230 after performing TNF on the first reference image 113. The method may comprise transmitting the second reference image 144 from the pan/tilt camera 300 to the remote device 230 after performing TNF on the second reference image 144.

The method may be implemented by a computer, decoder or another device with processing capabilities. A non-transitory computer-readable storage medium may be provided with instructions stored thereon for implementing the method, when executed by a device having processing capabilities.

FIG. 5 shows the pan/tilt camera 300 comprising an image capturing unit 202 and a computing unit 204. The pan/tilt camera 300 may be configured for performing the above described methods of FIG. 1, FIG. 2 and FIG. 3 as explained in conjunction with the pan/tilt camera 300 of FIG. 5.

The image capturing unit 302 may be understood as any device capable of capturing images. The image capturing unit 302 may comprise a charge-coupled device, CCD, image sensor or a complementary metal-oxide-semiconductor, CMOS, based active-pixel image sensor.

The computing unit 304 may comprise any device capable of performing processing and calculations according to the method. The computing unit may itself comprise several subunits for performing different actions or steps of the method.

The pan/tilt camera 300 is a camera configured to, when in use, being fixedly mounted and possible to pan and tilt, thereby capturing different fields of view. Fixedly mounted pan/tilt cameras used for monitoring or surveillance which can be manually or automatically controlled to be panned and/or tilted in order to capture different fields of view should be considered as non-limiting examples of the term pan/tilt camera. In addition to pan/tilt functionality, a pan/tilt camera may also include a zooming function and may then be referred to as a pan-tilt-zoom camera or PTZ camera.

The pan/tilt camera 300 may comprise a pan/tilt motor 310, as shown in FIG. 5, configured to pan and tilt the pan/tilt camera 300 to a desired panning and tilting. The panning and tilting may be controlled by a pan/tilt controller, such as a pan/tilt control function in the computing unit 304. The pan/tilt motor may comprise pan/tilt sensor (not shown) for providing feedback to the pan/tilt function in the computing unit 304 for feedback control to achieve the desired panning and tilting of the pan/tilt camera. The pan/tilt data comprising the values of a panning and a tilting of the pan/tilt camera associated with an image may relate to values of a panning and a tilting of the pan/tilt camera 300 according to a desired panning and tilting at a time of capturing the image. The pan/tilt data may further be corrected by means of a deviation from the desired panning and tilting as identified by a pan/tilt sensor at the time of capturing the image that as indicated in feedback from pan/tilt sensor. The pan/tilt camera 300 may comprise a light sensor 320 (photodetector), as shown in FIG. 5, configured to determine a light condition or a light level of the pan/tilt camera 300. The pan/tilt camera 300 may be configured for communication with a remote device 330, as shown in FIG. 5. The communication may be wireless or wired.

EMBODIMENT LIST

1. A method of noise reduction in images captured by a pan/tilt camera, the method comprising:
    a. providing a sequence of temporally successive images,
    b. selecting a first reference image among the temporally successive images,
    c. selecting a first plurality of images among the temporally successive images to be used for temporal noise filtering of the first reference image,
    d. forming a first plurality of transformed images by transforming each of the first plurality of images to have a same perspective as the first reference image,
    e. performing temporal noise filtering, TNF, on the first reference image using the first plurality of transformed images,
    f. selecting a second, different, reference image among the temporally successive images,
    g. selecting a second plurality of images among the temporally successive images to be used for temporal noise filtering of the second reference image, wherein at least one of the images of the second plurality of images is also comprised in the first plurality of images, wherein the second plurality of images comprises the first reference image,
    h. determining whether TNF of the second reference image should be performed or not, wherein upon determining that TNF should be performed, the method further comprises:
    i. forming a second plurality of transformed images by:
    i1. for each image of the second plurality of images not comprised in the first plurality of images, transforming said image to have a same perspective as the second reference image, wherein a perspective transform is determined and used to transform the first reference image to have the same perspective as the second reference image;
        i2. for each image of the second plurality of images also comprised in the first plurality of images, transforming, using the perspective transform used for transforming the first reference image, the corresponding transformed image among the first plurality of transformed images to have a same perspective as the second reference image;
    j. performing temporal noise filtering on the second reference image using the second plurality of transformed images.

2. The method according to embodiment 1, further comprising deleting one of the temporally successive images from a memory of the pan/tilt camera after transforming said one of the temporally successive images to have the same perspective as the first or the second reference image.

3. The method according to any one of embodiments 1 and 2, wherein each image of the first plurality of images temporally precedes the first reference image, and wherein each image of the second plurality of images temporally precedes the second reference image.

4. The method according to any one of embodiments 1 to 3, wherein the first plurality of images comprises 4-8 images, and wherein the second plurality of images comprises 4-8 images.

5. The method according to any one of the embodiments 1 to 4, wherein forming the first plurality of transformed images and forming the second plurality of transformed images comprise transforming images to have a same perspective as the associated reference image based on comparing motion data associated with each image in the sequence of temporally successive images.

6. The method according to embodiment 5, wherein the motion data associated with each image in the sequence of temporally successive images are pan/tilt data comprising values of a panning and a tilting of the pan/tilt camera associated with each image in the sequence of temporally successive images.

7. The method according to any one of embodiments 1 to 6, wherein step h further comprises determining a perspective difference between at least two images of the first plurality of images, wherein TNF of the second reference image is performed upon determining that the perspective difference is less than or equal to a predetermined perspective difference threshold, and wherein TNF of the second reference image is not performed upon determining that the perspective difference is larger than the predetermined perspective difference threshold.

8. The method according to embodiment 7, wherein the perspective difference is based on pan/tilt data temporally associated with each image, the pan/tilt data comprising values of a panning and a tilting of the pan/tilt camera associated with each image in the sequence of temporally successive images.

9. The method according to any one of the embodiments 1 to 8, further comprising, prior to step a, determining a capture condition for the sequence of temporally successive images, wherein the steps a-j are only performed upon determining that the capture condition meets a predetermined capture condition requirement.

10. The method according to embodiment 9, wherein the capture condition is determined by at least one of:
   a level of motion determined from pan/tilt data temporally associated with each image, the pan/tilt data comprising values of a panning and a tilting of the pan/tilt camera associated with different points in time; and
   a light level determined by a light sensor or by image analysis.

11. The method according to embodiment 10, wherein the capture condition is determined by a light level determined by a light sensor or by image analysis, wherein the predetermined capture condition requirement is a light level lower than a predetermined level.

12. The method according to any one of embodiments 1 to 11, further comprising storing the first reference image on a memory of the pan/tilt camera after performing TNF on the first reference image and storing the second reference image on the memory of the pan/tilt camera after performing TNF on the second reference image.

13. The method according to any one of embodiments 1 to 12, further comprising transmitting the first reference image from the pan/tilt camera to a remote device after performing TNF on the first reference image and transmitting the second reference image from the pan/tilt camera to the remote device after performing TNF on the second reference image.

14. A pan/tilt camera comprising an image capturing unit and a computing unit, the pan/tilt camera being configured for:
   a. capturing, by the image capturing unit, a sequence of temporally successive images,
   b. selecting, by the computing unit, a first reference image among the temporally successive images,
   c. selecting, by the computing unit, a first plurality of images among the temporally successive images to be used for temporal noise filtering of the first reference image,
   d. forming, by the computing unit, a first plurality of transformed images by transforming each of the first plurality of images to have a same perspective as the first reference image,
   e. performing, by the computing unit, temporal noise filtering, TNF, on the first reference image using the first plurality of transformed images,
   f. selecting, by the computing unit, a second, different, reference image among the temporally successive images,
   g. selecting, by the computing unit, a second plurality of images among the temporally successive images to be used for temporal noise filtering of the second reference image, wherein at least one of the images of the second plurality of images is also comprised in the first plurality of images, wherein the second plurality of images comprises the first reference image,
   h. determining, by the computing unit, whether TNF of the second reference image should be performed or not, wherein upon determining that TNF should be performed, the method further comprises:
   i. forming, by the computing unit, a second plurality of transformed images by:
      i1. for each image of the second plurality of images not comprised in the first plurality of images, transforming said image to have a same perspective as the second reference image, wherein a perspective transform is determined and used to transform the first reference image to have the same perspective as the second reference image;
      i2. for each image of the second plurality of images also comprised in the first plurality of images, transforming, using the perspective transform used for transforming the first reference image, the corresponding transformed image among the first plurality of transformed images to have a same perspective as the second reference image;
   j. performing, by the computing unit, temporal noise filtering on the second reference image using the second plurality of transformed images.

15. A non-transitory computer-readable storage medium having stored thereon instructions for implementing the method according to any one of embodiments 1 to 13, when executed by a device having processing capabilities.

Additionally, variations to the disclosed embodiments can be understood and effected by the skilled person in practicing the claimed invention, from a study of the drawings, the disclosure, and the appended claims.

The invention claimed is:

1. A method of noise reduction in images captured by a wearable camera, the method comprising:
   A. providing a sequence of temporally successive images,
   B. selecting a first reference image among the temporally successive images,
   C. selecting a first plurality of images among the temporally successive images to be used for temporal noise filtering of the first reference image,
   D. forming a first plurality of transformed images by transforming each of the first plurality of images to have a same perspective as the first reference image,
   E. performing temporal noise filtering, TNF, on the first reference image using the first plurality of transformed images,
   F. selecting a second, different, reference image among the temporally successive images,
   G. selecting a second plurality of images among the temporally successive images to be used for temporal noise filtering of the second reference image,
   wherein at least one of the images of the second plurality of images is also comprised in the first plurality of images,
   wherein the second plurality of images comprises the first reference image,
   H. determining whether TNF of the second reference image should be performed or not,
   wherein upon determining that TNF should be performed, the method further comprises:
   I. forming a second plurality of transformed images by:
      I1. for each image of the second plurality of images not comprised in the first plurality of images, transforming said image to have a same perspective as the second reference image,
      wherein a perspective transform is determined and used to transform the first reference image to have the same perspective as the second reference image;
      I2. For each image of the second plurality of images also comprised in the first plurality of images, transforming, using the perspective transform used for transforming the first reference image, the corresponding transformed image among the first plurality of transformed images to have a same perspective as the second reference image;
   J. performing temporal noise filtering on the second reference image using the second plurality of transformed images.

2. The method according to claim 1, further comprising deleting one of the temporally successive images from a memory of the wearable camera after transforming said one of the temporally successive images to have the same perspective as the first or the second reference image.

3. The method according to claim 1,
   wherein each image of the first plurality of images temporally precedes the first reference image, and
   wherein each image of the second plurality of images temporally precedes the second reference image.

4. The method according to claim 1,
   wherein the first plurality of images comprises 4-8 images, and
   wherein the second plurality of images comprises 4-8 images.

5. The method according to claim 1, wherein forming the first plurality of transformed images and forming the second plurality of transformed images comprise transforming images to have a same perspective as the associated reference image based on comparing motion data associated with each image in the sequence of temporally successive images.

6. The method according to claim 5,
   wherein the motion data associated with each image in the sequence of temporally successive images is determined by at least one of a motion sensor, an accelerometer, and a gyroscope, or
   wherein the motion data is determined based on image analysis of the images.

7. The method according to claim 1,
   wherein step H further comprises determining a perspective difference between at least two images of the first plurality of images,
   wherein TNF of the second reference image is performed upon determining that the perspective difference is less than or equal to a predetermined perspective difference threshold, and
   wherein TNF of the second reference image is not performed upon determining that the perspective difference is larger than the predetermined perspective difference threshold.

8. The method according to claim 7,
   wherein the perspective difference is based on at least one of:
   motion data temporally associated with each image, wherein the motion data is determined by a motion sensor, an accelerometer, or a gyroscope; and
   image data relating to how many pixels have changed between subsequent images of the first plurality of images.

9. The method according to claim 1, further comprising, prior to step A, determining a capture condition for the sequence of temporally successive images, wherein the steps A-J are only performed upon determining that the capture condition meets a predetermined capture condition requirement.

10. The method according to claim 9, wherein the capture condition is determined by at least one of:
    a level of motion determined by a motion sensor, an accelerometer, a gyroscope, or a positioning device; and
    a light level determined by a light sensor or by image analysis.

11. The method according to claim 9,
    wherein the capture condition is determined by a light level determined by a light sensor or by image analysis,
    wherein the predetermined capture condition requirement is a light level lower than a predetermined level.

12. The method according to claim 1, further comprising storing the first reference image on a memory of the wearable camera after performing TNF on the first reference image and storing the second reference image on the memory of the wearable camera after performing TNF on the second reference image.

13. The method according to claim 1, further comprising transmitting the first reference image from the wearable camera to a remote device after performing TNF on the first reference image and transmitting the second reference image from the wearable camera to the remote device after performing TNF on the second reference image.

14. A wearable camera device comprising a camera and a processor, the wearable camera device being configured for:
    A. capturing, by the camera, a sequence of temporally successive images,
    B. selecting, by the processor, a first reference image among the temporally successive images, C. selecting, by the processor, a first plurality of images among the temporally successive images to be used for temporal noise filtering of the first reference image, D. forming, by the processor, a first plurality of transformed images by transforming each of the first plurality of images to have a same perspective as the first reference image, E. performing, by the processor, temporal noise filtering, TNF, on the first reference image using the first plurality of transformed images, F. selecting, by the processor, a second, different, reference image among the temporally successive images, G. selecting, by the processor, a second plurality of images among the temporally successive images to be used for temporal noise filtering of the second reference image, wherein at least one of the images of the second plurality of images is also comprised in the first plurality of images, wherein the second plurality of images comprises the first reference image, H. determining, by the processor, whether TNF of the second reference image should be performed or not, wherein upon determining that TNF should be performed, the method further comprises:

I. forming, by the processor, a second plurality of transformed images by:

I1. for each image of the second plurality of images not comprised in the first plurality of images, transforming said image to have a same perspective as the second reference image, wherein a perspective transform is determined and used to transform the first reference image to have the same perspective as the second reference image;

I2. For each image of the second plurality of images also comprised in the first plurality of images, transforming, using the perspective transform used for transforming the first reference image, the corresponding transformed image among the first plurality of transformed images to have a same perspective as the second reference image;

J. performing, by the processor, temporal noise filtering on the second reference image using the second plurality of transformed images.

15. A non-transitory computer-readable storage medium having stored thereon instructions for implementing the method according to claim 1, when executed by a device having processing capabilities.

* * * * *